United States Patent [19]

Degen

[11] Patent Number: 4,522,104
[45] Date of Patent: * Jun. 11, 1985

[54] APPARATUS FOR AN AIRCRAFT FOR DROPPING OBJECTS, ESPECIALLY BOMBS

[75] Inventor: Max Degen, Luzern, Switzerland

[73] Assignee: Schweizerische Eidgenossenschaft vertreten durch die Gruppe für Rüstungsdienste, Emmen, Switzerland

[*] Notice: The portion of the term of this patent subsequent to Jan. 10, 2001 has been disclaimed.

[21] Appl. No.: 536,169

[22] Filed: Sep. 26, 1983

Related U.S. Application Data

[63] Continuation-in-part of Ser. No. 220,825, Dec. 29, 1980, Pat. No. 4,424,733.

[30] Foreign Application Priority Data

Sep. 29, 1980 [CH] Switzerland ............... 7264/80

[51] Int. Cl.³ ............................................. F41F 5/02
[52] U.S. Cl. ......................................... 89/1.51; 89/1.816; 244/137 R
[58] Field of Search ............... 89/1.5 R, 1.5 H, 1.816; 244/137 R, 137 A

[56] References Cited

U.S. PATENT DOCUMENTS

| | | | |
|---|---|---|---|
| 2,470,120 | 5/1949 | Walker | 244/137 R X |
| 2,723,093 | 11/1955 | Price et al. | 244/137 R |
| 2,790,304 | 4/1957 | Besserer | 137/15.1 X |
| 2,791,387 | 5/1957 | Weinberg | 244/137 R |
| 2,816,483 | 12/1957 | Johnston | 89/1.817 |
| 2,905,055 | 9/1959 | Camp et al. | 244/137 R |
| 2,913,198 | 11/1959 | Bonbrake | 89/1.5 R X |
| 3,056,335 | 10/1962 | Thieblot et al. | 89/1.5 R |
| 3,160,373 | 12/1964 | Taddonio | 244/137 R |
| 3,308,719 | 3/1967 | Myers | 89/1.5 R |
| 3,362,580 | 1/1968 | Chambers | 221/296 |
| 3,511,457 | 5/1970 | Pogue | 89/1.5 R X |
| 3,514,957 | 6/1970 | Evans | 60/270 |
| 3,547,000 | 12/1970 | Haberkorn et al. | 89/1.5 R |
| 3,964,391 | 6/1976 | Zacharin | 102/388 |
| 4,017,042 | 4/1977 | Jacobson | 244/137 R |
| 4,038,902 | 8/1977 | Welsh | 89/1.816 X |

FOREIGN PATENT DOCUMENTS

| | | |
|---|---|---|
| 266328 | 12/1912 | Fed. Rep. of Germany . |
| 355161 | 6/1922 | Fed. Rep. of Germany . |
| 1277678 | 9/1968 | Fed. Rep. of Germany . |
| 1005077 | 4/1952 | France . |
| 499083 | 12/1970 | Switzerland . |
| 533284 | 2/1941 | United Kingdom . |
| 709300 | 5/1954 | United Kingdom . |

Primary Examiner—David H. Brown
Attorney, Agent, or Firm—Werner W. Kleeman

[57] ABSTRACT

To drop objects from a container or receptacle mounted at an aircraft there is beneficially employed a pressure head. For this purpose the object mounted internally of the container upon guide rails is impinged at its front end by the flight-pressure head of the aircraft, so that it is ejected from the tail end of the container. For rapidly realizing the necessary safety distance between the aircraft and the dropped object at the tail end of the container there is deflected a flow onto the departing object, so that a pressure pulse is applied to the object and it is accelerated. The invention is particularly suitable for accurately laying a multiplicity of objects at surface-like or areal targets i.e. upon a given terrain. Its use is contemplated for both civilian applications, such as dropping life saving and supporting equipment and so forth, and military applications, such as for dropping bombs, especially fragmentation bombs, mines and other ordinance. The apparatus is extremely simple and functionally reliable. The only movable auxiliary means needed is a controllable bolt or equivalent structure within a blocking device for the release of the object.

19 Claims, 13 Drawing Figures

APPARATUS FOR AN AIRCRAFT FOR DROPPING OBJECTS, ESPECIALLY BOMBS

CROSS-REFERENCE TO RELATED APPLICATION

This application is a continuation-in-part application of my commonly assigned, copending U.S. application Ser. No. 06/220,825, filed Dec. 29, 1980, and entitled "Apparatus for an Aircraft for Dropping Objects" now U.S. Pat. No. 4,424,733 granted Jan. 10, 1984.

BACKGROUND OF THE INVENTION

The present invention relates to a new and improved construction of apparatus for use in conjunction with an aircraft for dropping the most sundry types of objects or the like, especially explosive objects, such as bombs, particularly fragmentation bombs, grenades, and mines at tactical flight velocities from relatively low altitudes overground.

The apparatus of the invention is generally of the type which comprises a transport container mounted at the aircraft and containing therein at least one object intended to be released from the aircraft.

During civilian and military use of aircraft it is frequently desired to lay objects over surface-like targets or terrain, such as regions affected by a catastrophe, agriculture regions, gun or weapon emplacement positions, landing fields at airports and so forth. During the tactical employment of military aircraft there are employed for this purpose so-called bomb dumping or scattering containers mounted at the fuselage of the aircraft and after successful dropping of the bombs they are usually dispersed by pyrotechnical means (compare Armada International 1980, Volume No. 3, page 130).

Generally speaking, the apparatus is realized by a container or receptacle mounted at an aircraft where there is beneficially employed a pressure head. For this purpose the object mounted internally of the container upon guide rails is impinged at its front end by the flight-pressure head of the aircraft, so that it is ejected from the tail end of the container. For rapidly realizing the necessary safety distance between the aircraft and the object dropped at the tail end of the container there is deflected a flow onto the departing object so that a pressure pulse is applied to the object and it is accelerated.

Additionally, for economical reasons, particularly when the equipment is used for non-combat tactical employment, reuse of the bomb dumping container is desired.

SUMMARY OF THE INVENTION

Therefore, with the foregoing in mind, it is a primary objective of the present invention to provide a new and improved construction of apparatus which enables accurate surface-like laying of objects at an area or target, without endangering the maneuvering aircraft.

A further important objective of the invention aims at providing an object release or dropping apparatus, mounted at an aircraft, wherein such apparatus can be reused.

Another important objective of the present invention aims at the provision of a new and improved construction of apparatus which improves the impact or hit patterns appearing at the ground or target without adverse effects on the maneuverability of the aircraft and without endangering its security.

Still a further significant objective of the present invention is directed to a new and improved construction of a fragmention bomb for use with such object release or dropping apparatus, which fragmentation bomb affords improved combat results at potential targets.

Now in order to implement these and still further objectives of the invention, which will become more readily apparent as the description proceeds, the apparatus of the present development is manifested by the features that the object mounted internally of the transport container is impinged at least during one time interval, prior to dropping of the object, and at least partially, i.e. a portion of the object is impinged, with a flight-pressure head.

The apparatus of the invention is particularly characterized by its simplicity, both as to its fabrication and servicing. The impact or hit patterns appearing at the ground or target, especially when the objects are dropped at a low level, display advantageous scattering of the objects both over the length and width of the target area. Dropping of the objects does not result in any adverse affects upon the maneuverability of the aircraft and only causes minimum dynamic reactions.

According to a further feature of the invention the transport container can be of substantially cylindrical shape. At its front end and it has a central air inlet and at its tail end at least one air outlet. With this design, the transport container can be constructed in an advantageous manner both from the standpoint of extreme economies in fabrication and also as concerns aerodynamic considerations.

The objects or the like can be mounted upon at least one guide rail, so that there is possible a precise ejection of the objects out of the transport container.

Preferably, the transport container defines an inner circumference about which three guide rails are arranged and spaced from each other by approximately 120°. One of the guide rails is located so as to extend normally or perpendicularly relative to an essentially horizontal flight direction. Each guide rail comprises a slideway or slide track and the object to be dropped comprises lateral guiding members which bear with at least one side thereof upon two respective slideways. Polytetrafluorethylene can be incorporated or embedded in the slideways. In such an arrangement the load which is determined by the weight of the object is distributed and transferred from the lateral guiding members to the slideways in a substantially normal or perpendicular direction, so that despite the static support of the object the total friction during movement of the object through the transport container does not cause increased friction during the ejection and dropping operation.

The transport container also could be designed to have at least one controllable blocking device which secures the object in axial direction against any displacement until the intended release of such object. This affords a particularly simple and remotely controllable release of the object.

According to a further design, it is possible to arrange a guide or outer ring at the tail end of the transport container which deflects the external air flow onto the object which departs form the transport container. Through the use of this guide ring the object departing from the transport container has applied thereto an additional pressure pulse, so that the ejected objects do not undesirably mutually influence or even contact one another.

Advantageously, the guide or outer ring comprises at least one stabilizing tail unit which may be constituted by reinforcing webs. By such design the transport container, when dropped in the case of an emergency, is subjected to a deceleration relative to the aircraft, and thus, rapidly leaves the region in which it would endanger the same.

When the objects have a substantially cylindrical shape there is possible a high packing density of the objects within the transport container. Additionally, the cylinder-like objects can be retarded or delayed in their movements following ejection out of the transport cylinder by using simple aerodynamic measures, such as brake flaps, parachutes and so forth.

A further possibility is to have the object possess an at least approximately spherical or ball-shaped configuration which affords a favorable delay or retardation action, especially promoting easy stacking of the objects.

A brake guide or drag mechanism can be provided at the objects for additionally bringing about an intended delay of the objects.

Furthermore, damping fins or equivalent structure can be provided at such brake guide mechanism so that there can be prevented wobble or tilting movements of the object, when it is dropped or ejected, and therefore there can be avoided any dynamically unstable flight behavior.

According to a further aspect of the invention a plurality of objects can be mounted in a stack-like fashion in axial direction within the transport container. The first object, viewed in the direction of aircraft flight, can be axially secured at the front-end wall of the container or at a stop upon a guide rail and the last object can be axially secured, until the desired time of release thereof, by a controllable bolt or equivalent structure provided at a blocking device. This construction particularly promotes the simultaneous surface-like or areal hitting of a target with a multiplicity of objects.

The aforementioned objects can be substantially spherically shaped fragmention bombs containing fragments made of steel balls which are imbedded in a matrix formed by a soft material. The fragmentation bombs may contain an electromechanical or an electromagnetic proximity fuze. Preferably, the electromechanical proximity fuze forms a telescopic rod-type fuze which is retracted at the front side into the fragmentation bomb essentially along the longitudinal axis thereof prior to ejection from the transport container and which is extended with a predetermined time-delay after the fragmentation bomb has left the transport container. Such fragmentation bombs result in a very well-shaped dispersion pattern with favorable dispersions in respect of length and width as well as with respect to fragment distributions.

It is also possible to provide three guide rails mounted at an inner wall of the transport container, and to design the brake guide or drag mechanism of the object as a substantially plate-shaped structure having recesses for the through-passage of the guide rails. The object, under the action of its normal force or weight, acts upon two points or locations of at least a lower one of the guide rails. With this construction there is afforded maximum utilization of the space available in the transport container, there result lower friction losses upon ejection of the objects, and this design is aerodynamically advantageous.

Also a controllable flap member or equivalent structure can be provided which allows the aircraft-pressure head to flow into the interior of the transport container in a pulse-like fashion. Hence, the object mounted in the transport container can be optimumly accelerated by a rectangular or square wave pressure surge.

The optimum pressure which can be set throughout a wide range of the aircraft velocity within the transport container can be augmented by additionally regulating the flight-pressure head. Equally, this pressure can be predetermined in order to obtain a predeterminable object scattering pattern, or with only partial filling of the container this effect can be realized through the use of a throttle valve. The throttle valve controls or regulates the pressure in the transport container, resulting from the flight-pressure head, as a function of the flight conditions of the aircraft and/or the momentary velocity of the aircraft. Also, it is therefore possible to correct, during dropping of the objects, any possibly arising disadvantageous initial conditions caused by the momentary maneuvering of the aircraft.

The transport container also can be provided with at least one lateral air inlet and one lateral air outlet, which thus serve to influence the pressure course or conditions internally of the container. In this way it is possible to optimize the ejection behavior of the objects.

It is also possible to provide an air gap between the inner wall of the transport container and the object and/or its brake guide or drag mechanism. This construction reduces the flow resistance of the transport container and additionally enables the realization of greater machining tolerances in the system.

To increase the operational safety of the apparatus, especially for increasing the control facilities of the pilot, the transport container may have incorporated therein electro-optic or electromagnetic indicating means for monitoring the presence of the objects in the transport container. The electro-optic indicating means may comprise a receiver-detector and advantageously this structure may be arranged at the tail end of an upper one of the guide rails in the transport container. Preferably, the electro-optic indicator is operated in a pulsed mode and at a high pulse frequency.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures there have been generally used the same reference characters to denote the same or analogous components and wherein:

FIG. 2a illustrates in longitudinal sectional view a sleeve-like object for receiving life saving equipment or the like;

DETAILED DESCRIPTION OF THE PREFERRED EMBODIMENTS

Figure 1:
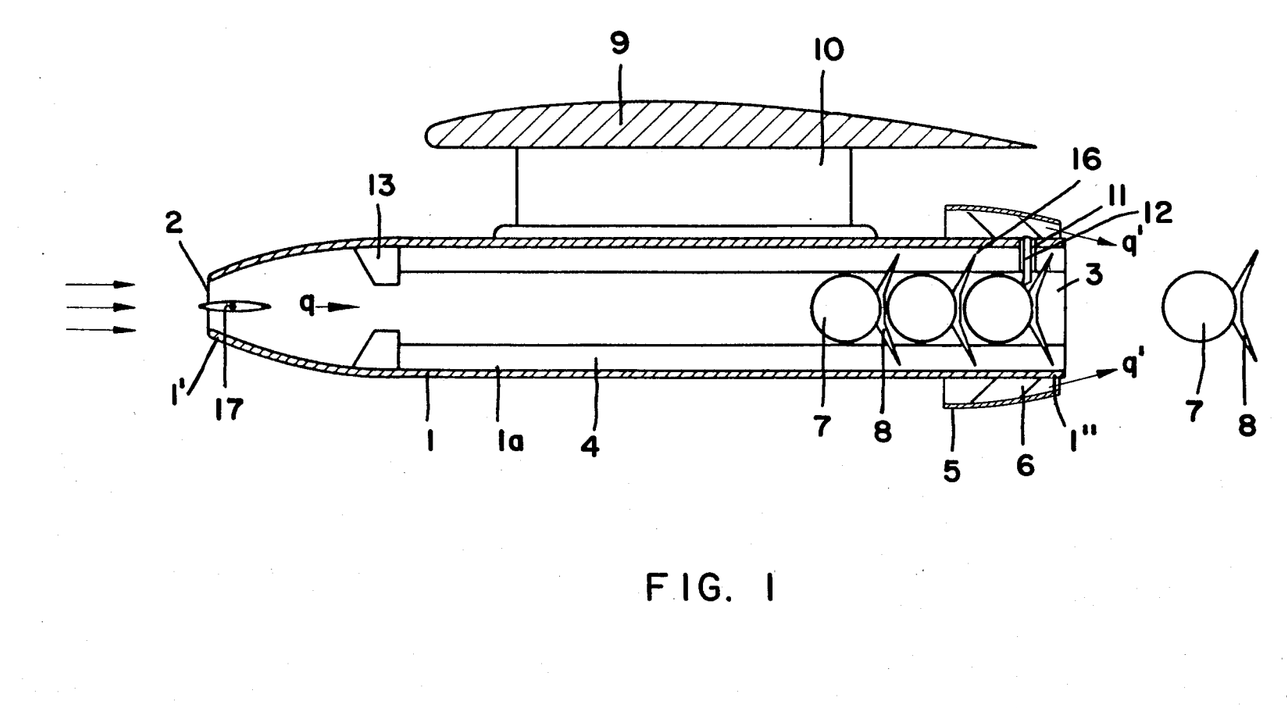
FIG. 1 illustrates in schematic view a transport container mounted at a carrying wing of an aircraft during such time as there are dropped objects.

Describing now the drawings, in FIG. 1 there is shown a substantially cylindrical-shaped transport container 1 with a front-end tapering tip 1'. At the container tip 1' there is located an air inlet 2 in which there is rotatably mounted a flap member 17 or equivalent air flow-control structure. At the container rear or tail end 1" there is provided for the transport container 1 an air outlet or exit location 3. Arranged in a stack-like fashion upon transport rails 4 or equivalent structure are the objects 7 which are to be dropped. These objects 7 are each provided with a respective plate-shaped brake guide or drag mechanism 8. Internally of the transport container 1 there appears part of the flight-pressure head q of the aircraft when the flap member 17 is in its open position. Also, by referring to FIG. 1 it will be seen that a front wall or region of the transport container 1 is provided with abutment or stop means 13 as an abutment for axially securing the objects 7 at the front end of such transport container.

The transport container 1 is attached in known manner by means of a pylon 10 or the like at the aircraft wing 9 of the aircraft. At the tail end 1" there is arranged at the transport container 1 a guide ring 5 through which is guided an external air flow q', corresponding to the flight-pressure head q, this air flow being guided behind the tail or rear end 1" of the container 1. The air flow or current which builds-up within the transport container 1, following opening of the flap member 17 or the like, is capable of flowing towards the tail-end 1" of the container 1 between the inner wall 1a of such transport container 1 and an air gap 16 formed by damping fins 15 or equivalent structure provided at the brake guide mechanism 8, as best seen by referring to FIG. 3b. The point in time of release of the object 7, and thus dropping thereof, is determined by upwardly raising or otherwise appropriately displacing a release or control bolt 12 or equivalent structure arranged in a suitable blocking device 11.

The flap member 17 arranged within the transport container 1 can be continuously maintained in its open state or even omitted. By rapidly closing the flap member 17 at a suitable point in time it is however possible to produce a pulse-like pressure course or condition within the container 1, so that there can be obtained an even more favorable ejection behavior as concerns the dropping of the object 7.

Figure 2A:
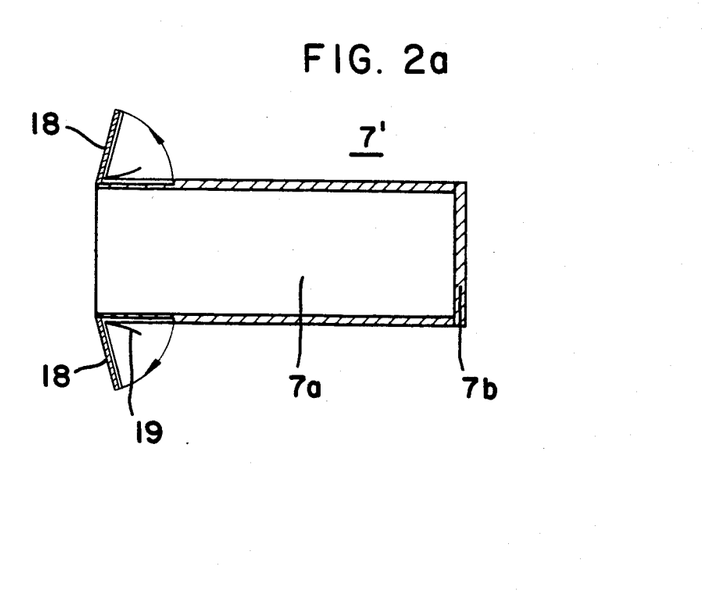
Figure 2B:
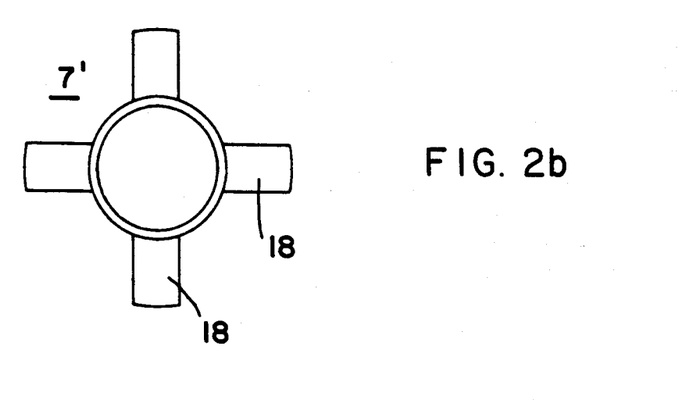
FIG. 2b illustrates the object of FIG. 2a during its free fall as viewed from the top.

The cylindrical-shaped object 7', shown by way of example in FIG. 2a, is provided at its front side with a flat end wall 7b. Internally of the object 7' there is located a relatively large charging space or volume 7a in which there can be stowed supply or life saving materials, such as for instance ammunition, inflatable rubber boats or dinghies, provisions and so forth. Brake flaps 18 which can be placed in an erected position in the direction of the arrows of FIG. 2a will be seen to be provided at the sides thereof confronting the cylinder-like object 7' with blade or leaf springs 19 which, upon departure of the object 7', serve as flight brakes and stabilizers in the manner illustrated in FIGS. 2a and 2b.

Figure 3A:
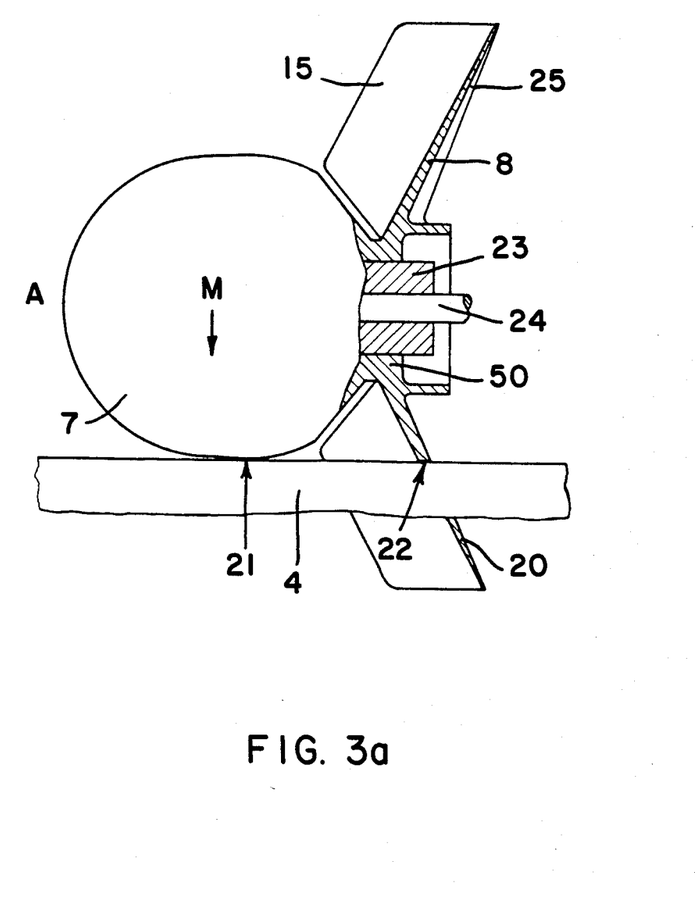
FIG. 3a illustrates a spherical-shaped object having a brake guide or drag mechanism and damping fins.

The ball or spherical-shaped object 7, for instance a bomb, illustrated in FIG. 3a, possesses at its tail end 50 a substantially plate-shaped brake guide mechanism 8 having damping fins 15 arranged perpendicular thereto and reinforcement ribs 25. The object 7 is supported upon a guide rail 4 at a first point or location 21 and also at a second point or location 22 of a recess 20 provided at the brake guide mechanism 8. Centrally of the brake guide mechanism 8 there is located a conventional ignition or detonation device 23, for instance a proximity fuze, having a fuze or ignition safety 24.

Figure 3B:
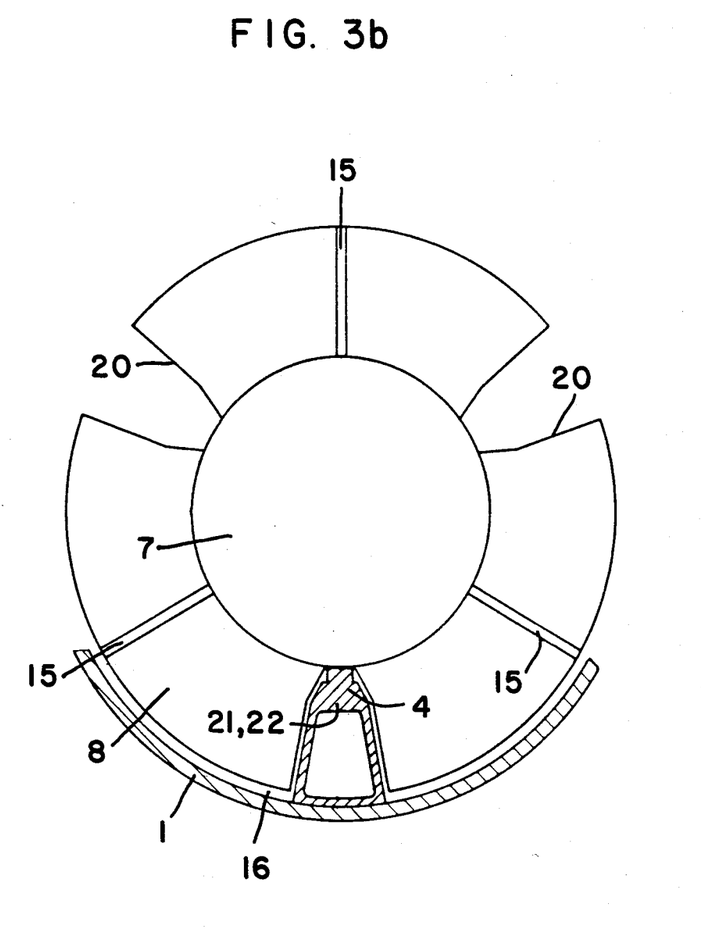
FIG. 3b illustrates the object of FIG. 3a in front view.

FIG. 3b is a fragmentary view showing the same object 7 as shown in FIG. 3a viewed from the side A. Once again there will be seen the substantially plate-shaped brake guide mechanism 8 with its damping fins 15 or the like. Extending through the three slot-shaped recesses 20 are the three guide rails 4, only the lowermost one of which has been particularly shown in FIG. 3b. The mass M is thus supported upon the two support or contact points 21 and 22 (see FIG. 3a) of the lower guide rail 4. The other upper guide rails 4 only serve for lateral guiding purposes.

Figure 4:
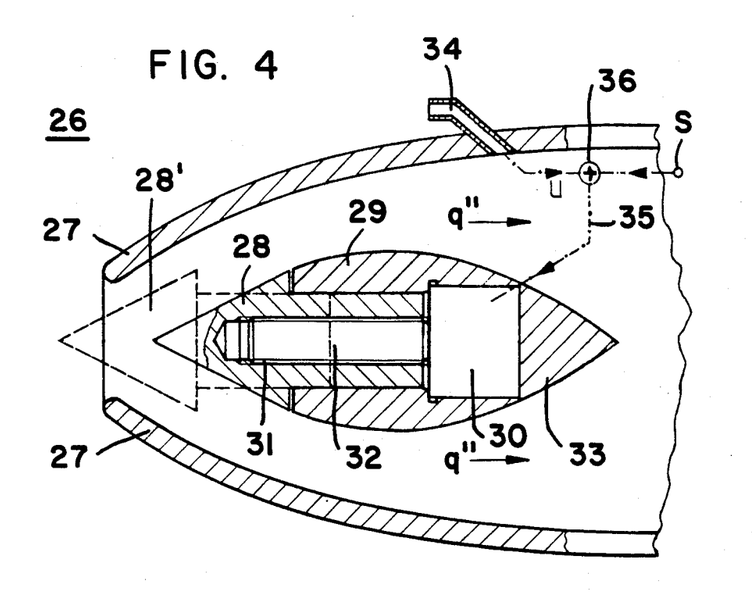
FIG. 4 illustrates a throttle valve having a regulation device for adjusting or setting a predetermined reduced pressure head.

Instead of using a simple flap member or flap valve 17, it also would be possible to provide a throttle valve 26, as shown in FIG. 4. With this modified construction there is controlled the flight-pressure head q" which adjusts itself internally of the transport container 1. For this purpose there is provided an axially displaceable valve body 28 having a central threaded bore 31. Within a teardrop or droplet-shaped constructed jacket or shell 29 there is located an electrical positioning or adjustment motor 30 which through running of the motor in the one or other direction can positionally adjust the valve body 28 by the action of a threaded bolt 32, through axial displacement thereof, at the required flight-pressure head q". The end position (partially closed position) of the valve body 28 has been shown in broken lines and designated by reference character 28'. The positioning motor 30 is lined by a cover 33 which is aerodynamically favorable i.e. to the flow conditions. Electrical control lines or conductors 35 lead to a signal source having a reference value input S. At a pressure head tube or pipe 28 there is arranged a pitot tube 34 which delivers by means of a standard mechanical-electrical measuring transducer a measuring signal u proportional to the flight-pressure head. By means of a signal coupling or linking device 36 there is accomplished in conventional manner the switching thereof to the reference value signal S.

The control containing the measuring transducer, as illustrated in FIG. 4, can be accommodated, automated and/or programmed in conventional manner by suitable regulating means to the operating conditions, such as flight velocity, flight condition, filling state of the container, mass of the objects, friction conditions and so forth.

According to a variant embodiment which is simpler than that shown in FIG. 4 the flight-pressure head acting upon a piston is used itself in conjunction with a spring system and a damping device as is conventional in automatic pressure control.

The subject matter of the invention is particularly suitable as a simple low level dropping or release system for objects. In the case of tactical flight velocities of about 180 to 300 m/s it is possible to dispense with variation of the air entry or inlet cross-section of the transport container 1. Expansion of the field of use can be obtained in a simple manner by providing a variable inlet cross-section for the pressure head.

Figure 5:
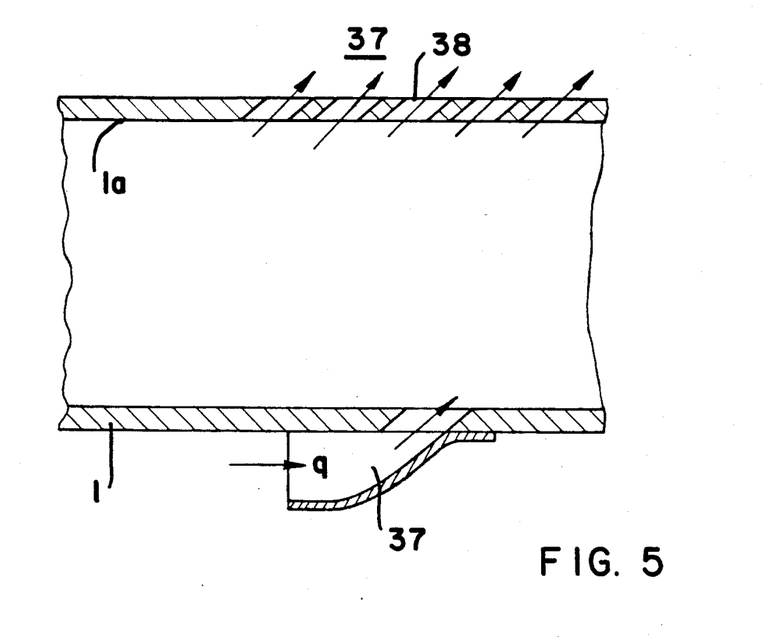
FIG. 5 is a fragmentary sectional view of a transport container having a lateral air inlet and lateral air outlet.

By means of additional openings, illustrated in FIG. 5, according to a variant construction of transport container 1, namely the lateral air inlet or inlets 37 and the air outlet or outlets 38, it is possible to optimize the ejection behavior of the objects.

The design of such type lateral air inlet and outlet, in the first instance, is dependent upon the objects themselves, such as their form, mass, friction forces and so forth.

A particularly favorable ratio of the mass of the object to the unit resistance ($C_{W.E}$) and thus a high delay of the object in relation to the aircraft is present. The surface-like laying of the objects at the target is extremely precise. The flight behavior of the objects is extensively reproducible and stable.

Figure 6:
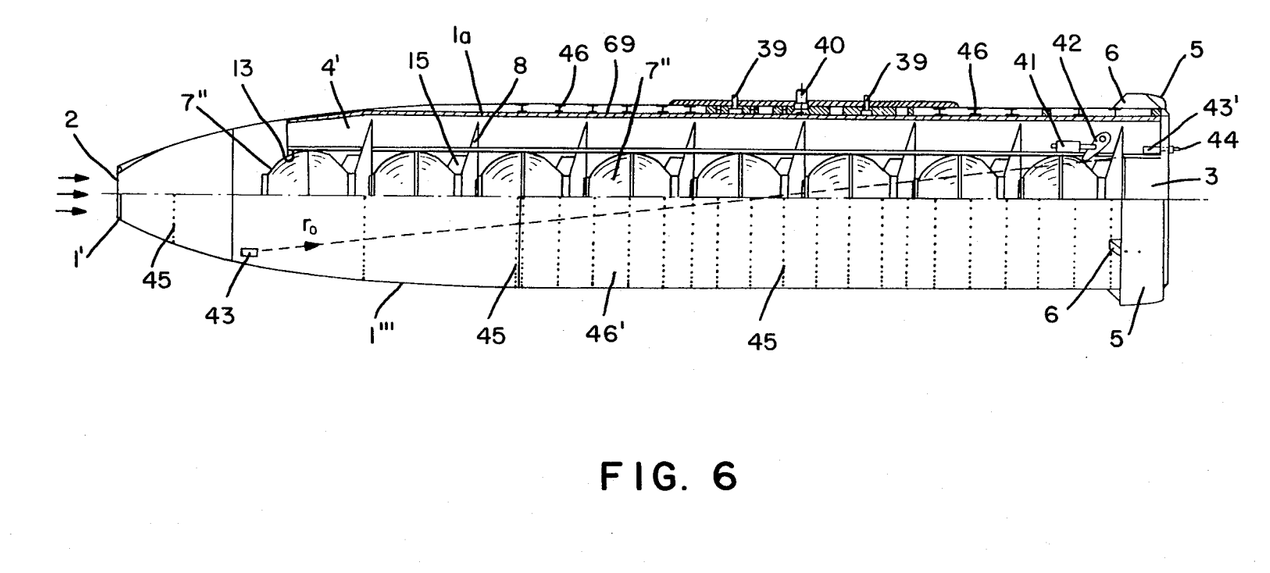
FIG. 6 illustrates in partial sectional view a transport container including substantially spherically shaped bombs or bomblettes.
Figure 7:
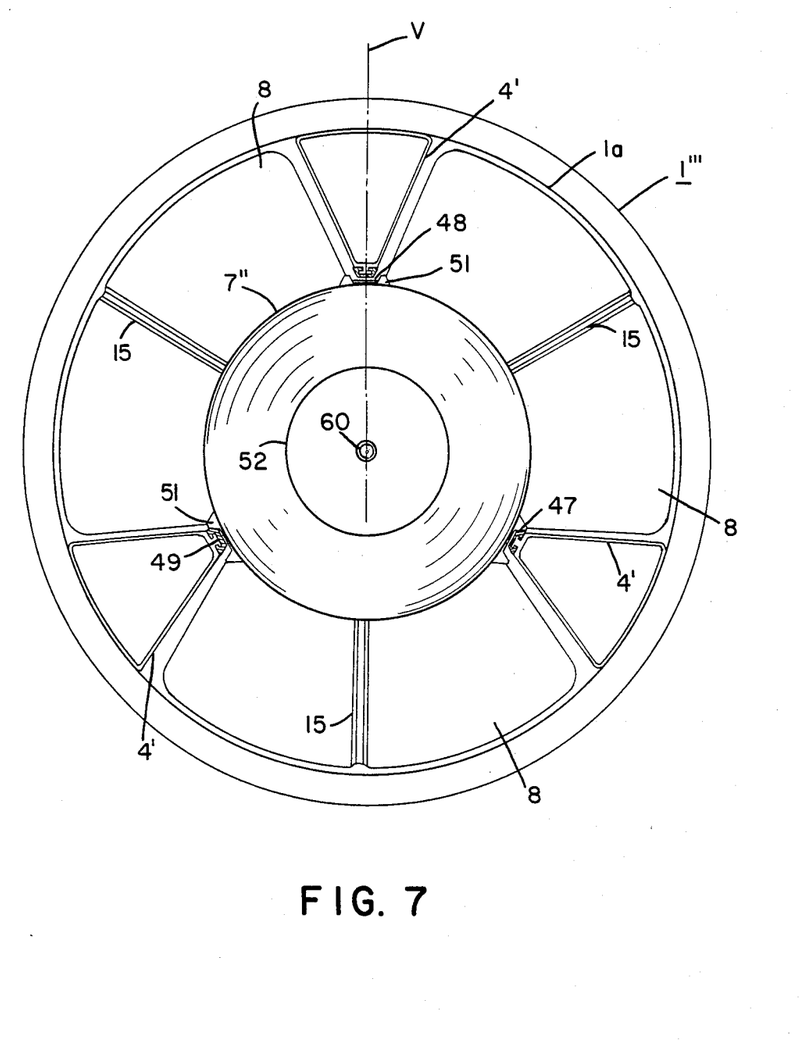
FIG. 7 is an enlarged cross-sectional view through the transport container shown in FIG. 6 and showing a bomb stored therein.

In FIGS. 6 to 9 further designs of the transport container and of objects stored therein are illustrated and the same reference numerals as employed in FIGS. 1, 2, 3a and 3b have been generally used to designate identical or analogous components of the transport container and of the objects stored therein in FIGS. 6 to 9. The transport container 1''' as illustrated in FIGS. 6 and 7 is a further development of the transport container 1 of the prior described embodiments. The transport container 1''' also has a front-end tapering tip 1' including an air inlet 2, and an air outlet 3 is provided at the tail end of such transport container 1'''.

Three transport or guide rails 4' are mounted at the inner wall 1a of the transport container 1''' and are distributed around the circumference thereof, typically at a spacing of about 120° with respect to one another. One of the transport or guide rails located at the upper portion of the inner wall 1a is arranged so as to extend essentially normally or perpendicular relative to the ordinary flight position i.e. the essentially horizontal position. A guide ring 5 is located at the tail end 1'' and is supported concentrically with respect to the transport container 1''' by means of reinforcing supporting webs or ribs 6.

The objects stored in the interior of the transport container 1''', as shown in FIGS. 6 and 7, constitute for instance eight substantially spherical-shaped fragmentation bombs 7''. Each fragmentation bomb 7'' which follows a preceding fragmentation bomb 7'' in a direction towards the tail end 1'' is supported at the drag mechanism 8 of the preceding fragmentation bomb 7''. Damping fins 15 are provided at each fragmentation bomb 7'' and extend transversely relative to the drag mechanism 8.

At the axis of gravity of the loaded transport container 1''' there is located a central bolt 40 which constitutes one member of a suspension or attachment mechanism, the other members of which are designated by reference numeral 39. The suspension or attachment mechanism 39, 40 enables the transport container 1''' to be readily and easily attached to combat aircraft.

The first one of the fragmentation bombs 7'' located on the front side is retained at its forward side by means of a stop or abutment 13 provided in the transport container 1'''. At the tail end 1'' the last one and thus all of the eight fragmentation bombs 7'' are secured in place by a spring-loaded pawl or latch 42 which is operatively connected to an electromagnet 41 acting as drive means for such pawl or latch 42.

It will furthermore be evident from FIG. 6 that the transport container 1''' comprises a double wall structure 69 at its central region which is formed by spacer rings 46 or equivalent structure. The transport container 1''' is thus formed by individual annular or ring-shaped segments, one of which is indicated at 46' in FIG. 6 which are interconnected by rivets 45 at the spacer rings 46.

Figure 10:
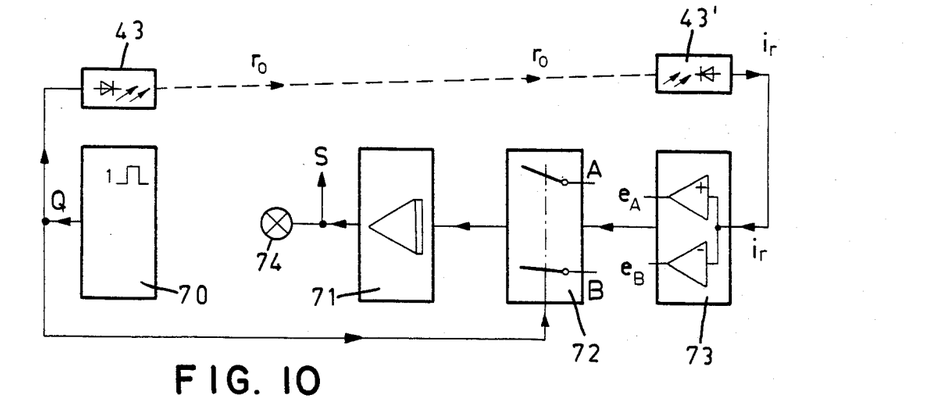
FIG. 10 is a schematic block circuit diagram of an electro-optical indicator for monitoring the loaded or empty state of the transport container.
Figure 11:
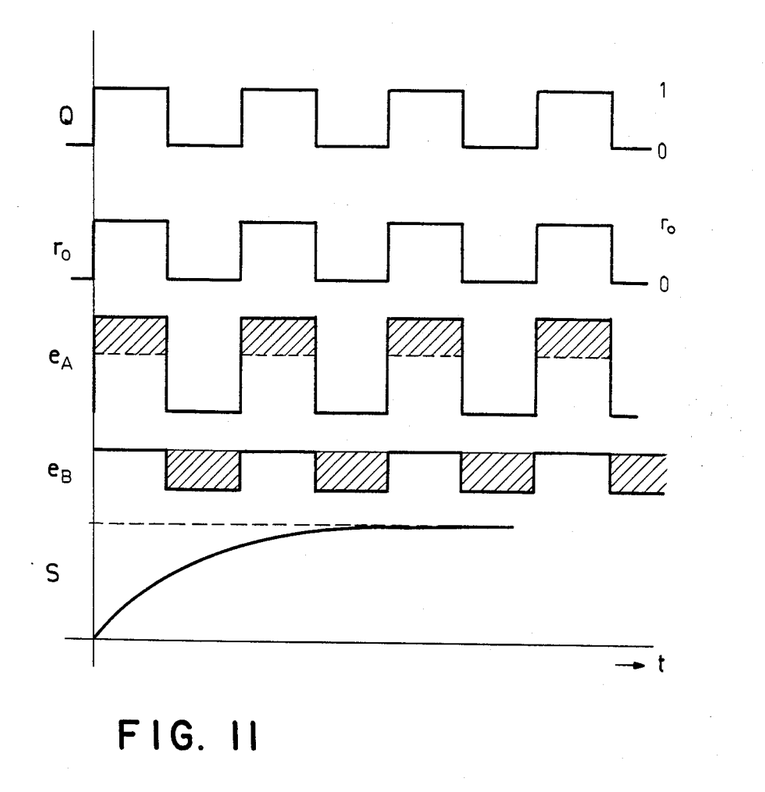
FIG. 11 represents characteristic signal patterns in the components of the electro-optical indicator shown in FIG. 10 as a function of time and serving to explain the mode of operation thereof.

The transport container 1''' is provided with an electro-optical indicator or indicating means illustrated in greater detail in FIGS. 10 and 11. This electro-optical indicator comprises a transmitter, generally designated by 43, located at the front side and a receiver-detector or receiver, generally designated by 43', located at the tail side. The transmitter 43 emits a beam of radiation $r_0$ which is directed towards the receiver-detector 43' and in the transmission path of which there are located all the eight fragmentation bombs 7''. The presence thereof in the transport container 1''' can thus be monitored by means of such electro-optical indicator. A terminal for connection to a signal line 44 is attached at the receiver-detector 43' also on the tail side. The signal line 44 extends to a suitable signalling instrument (not shown) arranged in the pilot's cockpit which serves to indicate the empty state of the transport container 1''' in the cockpit of the pilot. Details of the structure and function of the electro-optical indicating means or indicator will be described hereinafter with reference to FIGS. 10 and 11.

FIG. 7 is a cross-section through a substantially cylindrical portion of the transport container 1''' simultaneously showing a view of a fragmentation bomb 7'' stored in the interior of such transport container 1'''. On the front side of the fragmentation bomb 7'', and as seen in the direction of the horizontal axis thereof, the tip of a retracted telescopic rod-type fuze 60 will be recognized.

A vertical axis V which extends normally to the horizontal flight direction forms a symmetry axis for the upper transport or guide rail 4'. At an angular spacing of about 120° there are mounted two further lower transport or guide rails 4' which serve for supporting and guiding each of the fragmentation bombs 7''. A dovetail type connection 49 is provided at each of the inner ends of the transport or guide rails 4' which face the fragmentation bomb 7''.

The fragmentation bomb 7'' contains a substantially plate-shaped brake guide or drag mechanism 8, damping fins 15 and, in the spherical section thereof, three lateral guiding members 51 which are also essentially equidistantly distributed around the circumference of this section and mutually spaced by angles of about 120°. A centering ring 52 is arranged on the front side of the fragmentation bomb 7″. The lateral guiding or guide members 51 bear upon a slideway or slide track 47 and a slip or anti-friction layer 48 made of polytetrafluorethylene and located at the associated guide rail 4′. The slideway 47 is constituted by hard-chromium plated steel into which polytetrafluorethylene (TEFLON) is incorporated. Such materials and their manufacture are known in the art and are commercially available from the German company Tfe-lok P. Schreiber KG, Düsseldorf, Federal Republic of Germany. In this way the friction coefficient $\mu$ may be reduced to values in the range between 0.09 to 0.12.

The illustration of FIG. 7 furthermore shows that the forces acting on the two lower guide rails 4′ are divided into a support force or load and a lateral guiding force. Consequently, the total friction as compared to the heretofore known constructions, despite the presently realized statically determined support of the fragmentation bomb 7″ does not cause increased friction when the fragmentation bomb 7″ is dropped.

The system as illustrated in FIGS. 6 and 7 affords a high degree of safety in respect of the aircraft. In addition to the dynamically stable support of the fragmentation bomb 7″ there belong to this high degree of safety the design of the transport container 1‴ so as to be compatible with Mil. Spec. Mil-A-8591E, the possibility of an operational emergency drop in accordance with standard SK 16775 without endangering the aircraft, and also the reduction in the expense for achieving the state of readiness by using the electromagnet 41 for a simple and fail safe release of the bomb package from the transport container 1‴.

The guide ring 5 with its reinforcing or supporting webs or ribs 6 is mounted to the transport container 1‴ such that it acts as a stabilizing tail unit in the case of an operational emergency drop. Due to the decelerating action thereof relative to the aircraft the transport container 1‴ will be very rapidly removed from the zone in which it would endanger the aircraft in such a case. Depending on the selected type of aircraft the transport container 1‴ may be additionally augmented by a further simple stabilizing tail unit on the tail side thereof in order to optimize its dynamic behavior in case of an emergency drop.

Figure 8:
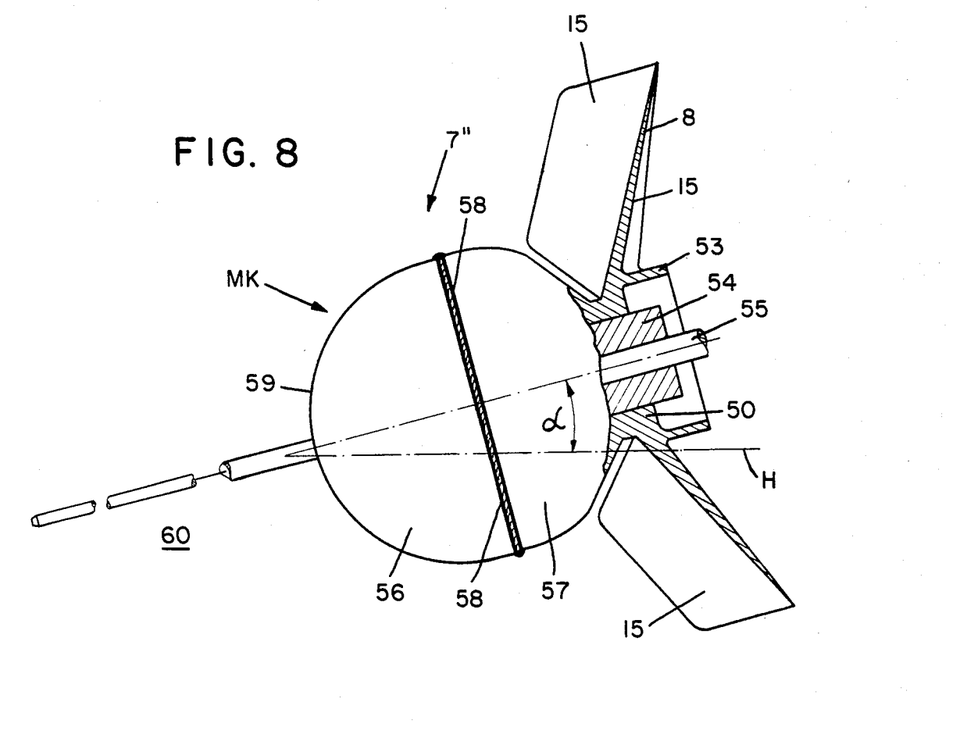
FIG. 8 is a partially sectional view of a fragmentation bomb including a telescopic rod-type fuze in a position shortly prior to being detonated above ground.

In FIG. 8 a fragmentation bomb 7″ is shown after having been dropped and in its trajectory near to the ground. The fragmentation bomb 7″ comprises an ammunition body MK with a fragmentation shell 59. Typically, the inclination angle α with respect to the horizontal line is in the range of 25° to 30°. The parts already shown in FIG. 7 will also be evident in FIG. 8. Additionally, there are schematically illustrated by the sectional view of the tail end 50 a tail flange 53 containing a safety and arming device 54 and a mechanical fuze protector 55.

Figure 9:
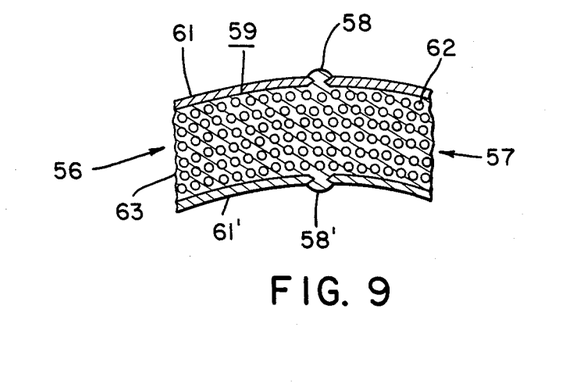
FIG. 9 is a sectional view of part of a fragmentation shell or jacket including ball-shaped or spherical fragments embedded in a matrix of a synthetic material of the fragmentation bomb shown in FIG. 8.

The ammunition body MK is constituted by two hemispherical shells 56 and 57, each of which is composed of jackets 61 and 61′ made of sheet steel to form a fragmentation shell 59. The jackets 61 and 61′ of the hemispherical shells 56 and 57 are welded together at weld seams 58 and 58′. The fragmentation shell 59 contains steel balls 62 forming the fragments. These steel balls 62 are cast into a matrix 63 which is composed of a soft shell material as, for instance, aluminium or an epoxide resin.

On the front side and in the flight direction of the fragmentation bombs 7″ there will be recognized a telescopic rod-type fuze 60 having a length of, for instance, about 2 meters; the length in practice and depending upon the selected fuze is typically in the range of 1.5 to 2.5 meters. This telescopic rod-type fuze 60 is extended in a manner which is known as such approximately 2 seconds after the fragmentation bomb 7′ has left the transport container 1‴. The telescopic rod-type fuze 60 also is designed in a manner known as such as an impact fuze which, after expiration of the entire arming time, becomes active by ground contact. The proximity fuze represented by the telescopic rod-type fuze 60 as described hereinbefore ignites the ammunition body MK approximately one meter above ground and thus produces a very well-defined dispersion or impact pattern with favorable dispersions in respect of length and width as well as fragment distributions.

In a further development of the system as described hereinbefore the ignition is accomplished by an electromagnetic proximity fuze which may operate on the basis of radar or laser radiation. The ignition signal of such an electromagnetic proximity fuze is preferably adjusted to a height of about 6 meters above ground which brings about a still further improvement of the resulting fragment distribution.

Commercially available so-called multi option fuzes also appear suitable for use as proximity fuzes for the fragmentation bombs 7″ as described hereinbefore.

The electro-optical indicator or indicating means containing the transmitter 43 and the receiver-detector 43′ as already illustrated in FIG. 6, serves to improve the operational safety of the dropping apparatus, especially to increase the control capabilities by the pilot. As shown in FIG. 6, the transmitter 43 is installed at the front region of the transport container 1‴ while the receiver-detector 43 is installed at the upper guide rail 4′. The angle of radiation emitted by the transmitter 43 amounts to about 6° as measured relative to the horizontally arranged guide rails 4′.

Further details of the structure of the electro-optical indicator 43 are illustrated in FIG. 10. As shown in such FIG. 10, the transmitter 43 is composed of a conventional transmitter diode which emits infrared radiation indicated by the broken line $r_0$. The transmitting diode is controlled in a pulse-like manner or pulsed mode by a clock or pulse generator 70 at a pulse period T=1 ms. In the receiver-detector 43′ the radiation $r_0$ is received and converted into a current $i_r$. This current $i_r$ is supplied to a complementary operating pair of amplifiers 73 and is converted thereby into the signals $e_A$ and $e_B$ (see also FIG. 11). These signals are fed to a difference former or subtractor 72 series connected to the amplifier 73 and comprising switches A and B which are also controlled by the output Q of the clock or pulse generator 70. In this way the signals $e_A$ and $e_B$ are transformed into a useful signal in a manner known as such which, in turn, is fed to an integrator 71. A control signal S is derived from the integrator 71 and serves, inter alia, to activate an indicator lamp 74.

FIG. 11 shows the signal pattern as a function of time appearing at the outputs of the relevant components and characterizes this safety of the circuit realized on the basis of FIG. 10. The hatched areas of the pulses shown in FIG. 11 represent the elimination of undesired stray light at the clocked difference former or subtractor 72.

The transmitting diode which operates in the infrared region may be replaced by other diodes which operate, for example, in the region of visible light. Instead, various other electro-optical or electromagnetic indicating means or indicators or monitors may be realized which operate, for example, on the laser principle. The illumination of the indicator lamp 74 is an indication of the empty state of the transport container 1'''. An indication of the presence of this empty state, when the objects have been dropped and the transport container 1''' is completely emptied, is very much desired by the pilot. It permits the pilot to totally utilize the capabilities of the aircraft system in the case of unexpected aerial combat.

The construction of the system as illustrated hereinbefore is particularly distinguished by its simplicity, relatively low-maintenance requirements, by its economy and by its operational safety. In tactical use the system is very well suited for so-called Nap of the Earth (NOE) missions.

The mass of the individual objects, e.g. bombs can be chosen without any impairment as to their action at the surface-like target such that the loading of the transport container can be accomplished without any great effort by a single person or operator.

The single required movable part of the transport container is the bolt or the like of the blocking device which is used for releasing the objects; for this purpose there has been found to be suitable a pyrotechnical or electromechanical activation.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for an aircraft for dropping objects, especially explosive objects such as bombs, grenades and mines, comprising:
a transport container capable of being mounted at the aircraft;
said transport container being provided with at least one object mounted therein and intended to be dropped from the aircraft;
said transport container having an inner circumference;
at least three guide rails arranged about said inner circumference and spaced from each other by an angle of approximately 120°;
one of said guide rails being located so as to extend essentially normally relative to a substantially horizontal flight direction of the aircraft; and
means for applying to the object mounted internally of the transport container, at least during one time interval prior to dropping such object and at least partially thereat, a flight-pressure head of the aircraft.

2. The apparatus as defined in claim 1, further including:
a brake guide mechanism provided at the object;
said brake guide mechanism possessing a substantially plate-shaped configuration and having recess means for the throughpassage of the guide rails;
one of said guide rails defining at least a lower guide rail; and
said object bearing under the action of its weight upon two points at least at said lower guide rail.

3. The apparatus as defined in claim 1, further including:
at least one controllable blocking device provided for said transport container; and
said blocking device securing the object in axial direction against any displacement thereof until the point in time of intended release of said object.

4. The apparatus as defined in claim 3, wherein:
said controllable blocking device comprises electromagnetic blocking means.

5. The apparatus as defined in claim 1, wherein:
each said object comprises a substantially spherically shaped fragmentation bomb; and
said fragmentation bomb containing fragments formed of steel balls embedded in a soft material matrix.

6. The apparatus as defined in claim 5, further including:
an electromechanical proximity fuze provided for said fragmentation bomb.

7. The apparatus as defined in claim 6, wherein:
said electromechanical proximity fuze defines a telescopic rod-type fuze;
said fragmentation bomb having a front side and a longitudinal axis; and
said telescopic rod-type fuze being retracted at said front side into said fragmentation bomb substantially along said longitudinal axis thereof prior to ejection of the same from said transport container and being extended with a predetermined time delay after said fragmentation bomb has departed from said transport container.

8. The apparatus as defined in claim 1, further including:
electro-optical indicating means cooperating with said transport container for monitoring the presence of said at least one object.

9. The apparatus as defined in claim 8, wherein:
said electro-optical indicating means comprises a receiver-detector.

10. The apparatus as defined in claim 8, further including:
said guide rails including an upper guide rail having a tail end; and
said electro-optical indicating means being installed at said tail end of said upper guide rail.

11. The apparatus as defined in claim 8, wherein:
said electro-optical indicating means comprises a pulsed indicator arrangement operated at a relatively high clock frequency.

12. The apparatus as defined in claim 1, wherein:
said flight-pressure head applying means comprises guide ring means arranged at a rear end portion of said transport container; and
said guide ring means deflecting an external air flow onto the object departing from the transport container.

13. The apparatus as defined in claim 12, wherein:
said guide ring means comprises at least one stabilizing tail unit.

14. The apparatus as defined in claim 13, wherein:
said stabilizing tail unit contains reinforcing webs.

15. The apparatus as defined in claim 1, further including:
lateral guiding members provided for said at least one object;
each of said guide rails being provided with a slideway; and
two of said lateral guiding members bearing at least at one side thereof upon predetermined ones of said slideways, so as to transfer approximately one-half of the load governed by the weight of said object from said lateral guiding members to said guide rails.

16. The apparatus as defined in claim 15, wherein:
said slideway has embedded therein polytetrafluoroethylene.

17. The apparatus as defined in claim 16, further including:
guide means provided at said object and cooperating with said slideways.

18. An apparatus for an aircraft for dropping objects, especially explosive objects such as bombs, grenades and mines, comprising:
a transport container capable of being carried by the aircraft in a stationary position relative to said aircraft;
said transport container having a substantially cylindrical configuration which defines a lengthwise axis, a front end and a rear end;
a plurality of substantially spherical objects having a favorable ratio of object mass to unit resistance;
said objects being arranged in said transport container in a stacked confrguration in the direction of said lengthwise axis;
at least three guide rails for guiding said objects for movement through said transport container in the direction of said lengthwise axis;
said at least three guide rails being arranged about an inner circumference pf said transport container and being spaced from each other by an angle of approximately 120°; and
one of said guide rails being located so as to extend essentially perpendicular relative to a substantially horizontal flight direction of the aircraft.

19. An apparatus for an aircraft for dropping objects, especially explosive objects such as bombs, grenades and mines, comprising:
a transport container capable of being carried by the aircraft in a stationary position relative to said aircraft;
said transport container having a substantially cylindrical configuration which defines a lengthwise axis, a front end and a rear end;
a plurality of substantially spherical objects having a favorable ratio of object mass to unit resistance;
said objects being arranged in said transport container in a stacked configuration in the direction of said lengthwise axis;
at least three guide rails for guiding said objects for movement through said transport container in the direction of said lengthwise axis;
said at least three guide rails being arranged about an inner circumference of said transport container and being spaced from each other by an angle of approximately 120°;
one of said guide rails being located so as to extend essentially perpendicular relative to a substantially horizontal flight direction of the aircraft;
drag stabilizing means mounted at said objects;
means for applying to said plurality of objects mounted internally of said transport container, at least during one time interval prior to dropping said objects in series and at least partially and directly at the series of objects, a flight-pressure head of said aircraft;
said drag stabilizing means comprising brake guide means provided at each one of said objects;
said brake guide means possessing a substantially plate-shaped configuration and having recess means for the through-passage of said guide rails;
one of said guide rails defining at least a lower guide rail; and
each one of said objects bearing under the action of its weight upon two points at least at said lower guide rail.

* * * * *

UNITED STATES PATENT AND TRADEMARK OFFICE
CERTIFICATE OF CORRECTION

PATENT NO. : 4,522,104
DATED : June 11, 1985
INVENTOR(S) : Max Degen

It is certified that error appears in the above—identified patent and that said Letters Patent is hereby corrected as shown below:

Column 7, line 32, please delete "$(C_{W.E})$" and insert --$(C_{W.F})$--

Column 10, line 8, please delete "7'" and insert --7''--

*Signed and Sealed this*

*Fifteenth* Day of *October 1985*

[SEAL]

*Attest:*

DONALD J. QUIGG

*Attesting Officer*      *Commissioner of Patents and Trademarks—Designate*